US008907641B2

United States Patent

(12) United States Patent
Zhang et al.
(10) Patent No.: US 8,907,641 B2
(45) Date of Patent: Dec. 9, 2014

(54) CIRCUIT AND METHOD FOR SHORT CIRCUIT PROTECTION

(75) Inventors: HaiBo Zhang, Shenzhen (CN); GuangFeng Wang, Shenzhen (CN); Jin Li, Shenzhen (CN)

(73) Assignee: STMicroelectronics (Shenzhen) R&D Co. Ltd., Shenzhen (CN)

( * ) Notice: Subject to any disclaimer, the term of this patent is extended or adjusted under 35 U.S.C. 154(b) by 562 days.

(21) Appl. No.: 13/313,688

(22) Filed: Dec. 7, 2011

(65) Prior Publication Data

US 2012/0169309 A1 Jul. 5, 2012

(30) Foreign Application Priority Data

Dec. 31, 2010 (CN) .......................... 2010 1 0624784

(51) Int. Cl.
*H02H 3/24* (2006.01)
*G05F 1/613* (2006.01)
*H02M 3/158* (2006.01)
*H02M 1/32* (2007.01)

(52) U.S. Cl.
CPC ................ *H02M 1/32* (2013.01); *H02M 3/158* (2013.01)
USPC ............................................ 323/271; 361/92

(58) Field of Classification Search
CPC ........................... H02H 11/005; H02H 11/007
USPC ................. 323/222–225, 271, 276, 282, 284; 363/78–80; 307/130; 361/18, 59, 89, 361/92
See application file for complete search history.

(56) References Cited

U.S. PATENT DOCUMENTS 6,751,078 B1 * 6/2004 Munakata et al. .............. 361/58

FOREIGN PATENT DOCUMENTS

CN 101594047 A 12/2009
WO WO 9726695 A2 * 7/1997

* cited by examiner

*Primary Examiner* — Matthew Nguyen
*Assistant Examiner* — Jye-June Lee
(74) *Attorney, Agent, or Firm* — Gardere Wynne Sewell LLP

(57) ABSTRACT

A boost converter includes an input terminal and an output terminal. A first switch is connected between a first intermediate node and a reference potential node. An inductive component is connected between the input terminal and the first intermediate node. A rectifying component is connected between the first intermediate node and a second intermediate node. A multi-state module is connected between the second intermediate node and the output terminal, and has at least a low resistance state and a high resistance state. A control module is coupled to the output terminal, the first switch and the multi-state module, and is operable in response to an output voltage to control the first switch and the multi-state module so that the first switch is open and the multi-state module is in the high resistance state if the output voltage is lower than a threshold value.

28 Claims, 6 Drawing Sheets

CIRCUIT AND METHOD FOR SHORT CIRCUIT PROTECTION

PRIORITY CLAIM

This application claims priority from Chinese Application for Patent No. 201010624784.7 filed Dec. 31, 2010, the disclosure of which is hereby incorporated by reference.

TECHNICAL FIELD

This invention relates generally to electronic circuits, and more particularly to a boost converter.

BACKGROUND

A boost converter is a power converter with an output DC voltage greater than its input DC voltage. This type of circuit is used to "step-up" a source voltage to a higher, regulated voltage, allowing one power supply to provide different driving voltages.

As shown in FIG. 1, an example of conventional boost converter uses an inductor 2 as an energy storage component, the charging and discharging of which are controlled by a power switch 6 and a diode 4. Sometimes a capacitor connects the output terminal 5 and the ground to supply a steady output voltage. A potential problem with using such a boost converter in FIG. 1 is that the converter cannot be truly shut down which makes for large power consumption when the converter is in standby mode. Moreover, the boost converter in FIG. 1 is not short circuit proof, because there is inherently no switch-off device in the short circuit path. In particular, once the output terminal 5 is short connected, current from the input terminal 1 to the output terminal 5 will rise uncontrollably and may damage the circuit components (the diode 5, for example).

A known solution for the problem of shutdown is shown in FIG. 2 and consists of providing a load switch 7 between the diode 4 and the output terminal 5. When the converter needs to be shut down, the power switch 6 and the load switch 7 are opened and the input terminal 1 is isolated from the output terminal 5.

However, the boost converter in FIG. 2 still has the problem of short circuit. In detail, current may rise to a remarkable level within micro-seconds, for example, and damage circuit components when a short circuit event happens. To prevent this condition, the load switch 7 should be opened immediately. However it is not feasible for the boost converter in FIG. 2 to do so because the load switch 7 should be closed for a period long enough to safely remove the current energy stored in the inductor 2 prior to shutting down of the converter, otherwise the energy of the inductor 2 can cause the voltage at node 8 to rise to a high level which can damage devices connected to the node 8.

Thus there is a need for a circuit and method providing both short circuit protection and energy removal.

SUMMARY

In one embodiment, there is provided a circuit that comprises an input terminal to receive an input voltage; an output terminal to supply an output voltage; a first switch coupled between a first intermediate node and a reference potential line; an inductive component coupled between the input terminal and the first intermediate node; a rectifying component coupled between the first intermediate node and a second intermediate node; a multi-state module coupled between the second intermediate node and the output terminal having at least a low resistance state and a high resistance state; and a control module coupled to the output terminal, the first switch and the multi-state module and configured to control the first switch and the multi-state module so that the first switch is open and the multi-state module is in the high resistance state in response to the output voltage being lower than a threshold value.

In a further embodiment, the multi-state module further has an off state and is in the off state after a first time delay initiated by the output voltage being lower than the threshold value.

In still a further embodiment, the control module is further configured to enable the circuit to operate in a precharge mode or in a shutdown mode in response to a first control signal. In one example, the multi-state module is in the high resistance state until a second time delay is complete and afterwards switched to the low resistance state if the output voltage is higher than the threshold value or kept in the high resistance state if the output voltage is lower than the threshold value; and the first switch is open until a third time delay is complete and afterwards closed if the output voltage is higher than the threshold value or kept open if the output voltage is lower than the threshold value, when the circuit is in the precharge mode. In another example, the first switch is open and the multi-state module is in the high resistance state and switched to the off state after the first time delay is complete if the circuit is in the shutdown mode.

In still a further embodiment, there is provided a circuit that comprises an input terminal to receive an input voltage; an output terminal to supply an output voltage; a first switch connected between a first intermediate node and a reference potential line; an inductive component connected between the input terminal and the first intermediate node; a rectifying component connected between the first intermediate node and a second intermediate node; a second switch connected between the second intermediate node and the output terminal; a third switch connected in parallel with the second switch, wherein the third switch has a larger on-resistance than that of the second switch; and a control module configured to open the first and second switches and close the third switch in response to the output voltage being lower than a threshold value.

In still a further embodiment, there is provided a boost converter that comprises a circuit according to the various embodiments described.

In still a further embodiment, there is provided an electronic device that comprises a circuit according to the various embodiments described.

In still a further embodiment, a circuit is operated by comparing an output voltage of a circuit to a threshold value; coupling a high resistance serially in a current path between an input terminal and an output terminal of the circuit if the output voltage is lower than the threshold value; and discharging the circuit through the high resistance so as to limit a current level in the current path.

In still a further embodiment, the circuit is operated by further isolating the input terminal from the output terminal after a first time delay after the step of discharging.

In still a further embodiment, the circuit is operated by precharging the circuit with the high resistance connected between the input and output terminals until a comparing between the output voltage of the circuit and the threshold value is initiated.

The foregoing has outlined, rather broadly, features of the present disclosure. Additional features of the disclosure will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present disclosure and are not necessarily drawn to scale. To more clearly illustrate certain embodiments, a letter indicating variations of the same structure, material, or process step may follow a figure number.

DETAILED DESCRIPTION OF THE DRAWINGS

The making and using of embodiments are discussed in detail below. It should be appreciated, however, that the specific embodiments discussed are merely illustrative, and do not limit the scope of the invention.

Figure 1:
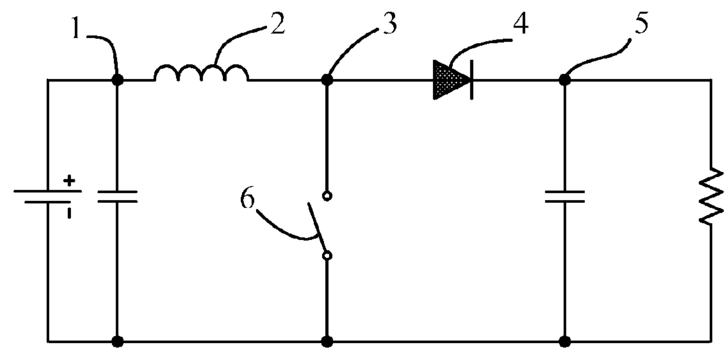
FIG. 1 illustrates an example of conventional boost converter.
Figure 2:
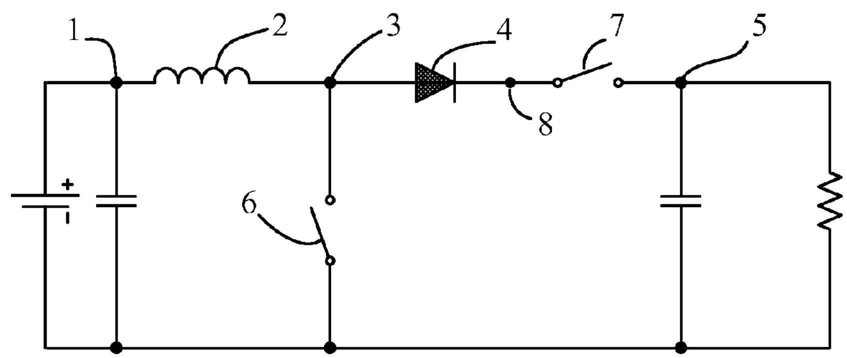
FIG. 2 illustrates another example of conventional boost converter.
Figure 3:
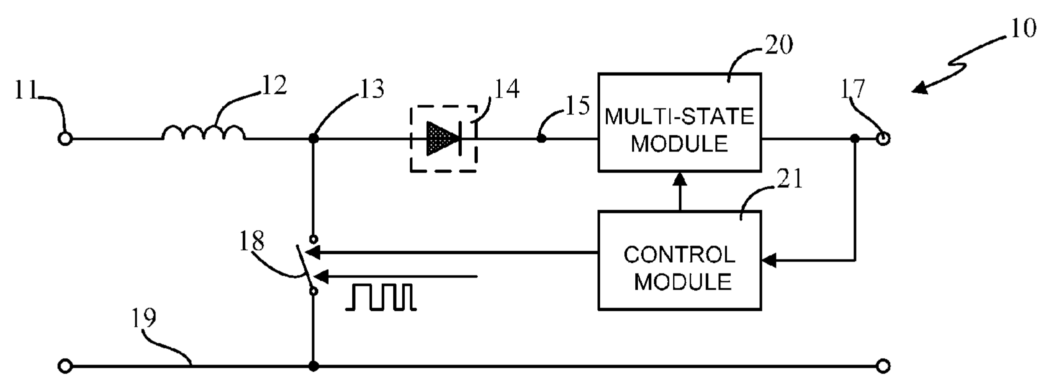
FIG. 3 illustrates a simplified circuit diagram of a first embodiment of a circuit.

FIG. 3 illustrates a simplified circuit diagram of a first embodiment of a circuit which comprises an input terminal 11 to receive an input voltage; an output terminal 17 to supply an output voltage; a first switch 18 connected between a first intermediate node 13 and a reference potential line 19; an inductive component 12 connected between the input terminal 11 and the first intermediate node 13; a rectifying component 14 connected between the first intermediate node 13 and a second intermediate node 15; a multi-state module 21 connected between the second intermediate node 15 and the output terminal 17 (said module having at least a low resistance state and a high resistance state); and a control module 22 coupled to the output terminal 17, the first switch 18 and the multi-state module 21, said module configured to control the first switch 18 and the multi-state module 21 in response to the output voltage so that the first switch 18 is open and the multi-state module 21 is in the high resistance state as long as the output voltage is lower than a threshold value.

Figure 4:
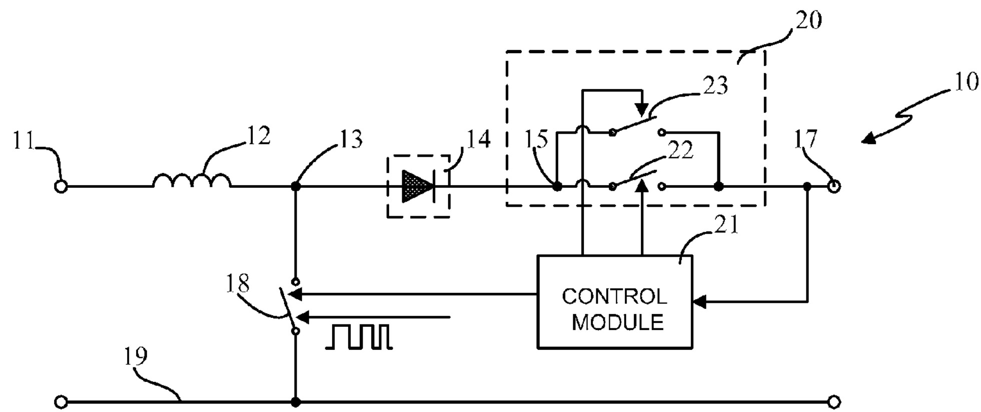
FIG. 4 illustrates a detailed circuit diagram of a module of the circuit of FIG. 3.

In detail, the multi-state module 20 is formed, for example, by a second switch 22 and a third switch 23 as shown in FIG. 4, which are connected in parallel with each other between the second intermediate node 15 and the output terminal 17. The third switch 23 has a larger on-resistance than that of the second switch 22 so that the multi-state module 20 is in the high resistance state (between nodes 15 and 17) when the third switch 23 is closed and the second switch 22 is open, and in the low resistance state (between nodes 15 and 17) when the second switch 22 is closed. It will be appreciated that the first, second and third switches may be, for example, metal-oxide-semiconductor field-effect transistors (MOSFETs), insulated gate bipolar transistors (IGBTs), or other semiconductor switching devices.

Figure 5:
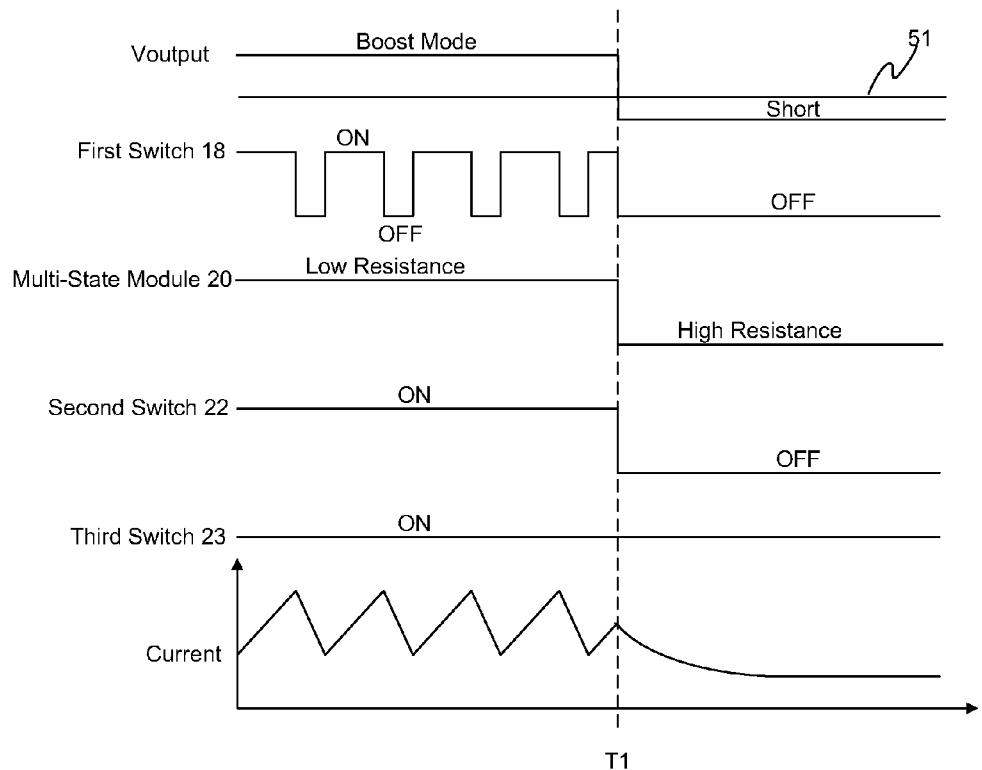
FIG. 5 illustrates an operation mode of the circuit of FIG. 3.

FIG. 5 shows an exemplary operation mode of the circuit of FIGS. 3 and 4.

Prior to a time T1, the circuit 10 operates in a “normal” boost mode. In practice, the first switch 18 is switched closed and open in responding to a pulse train. The pulse train may be provided by a conventional pulse train generator of the circuit 10 which generates the pulse train based on the output voltage measurement. As is known, the inductor 12 is charged when the first switch 18 is closed and the energy stored in the inductor 12 is transferred through the diode 14 towards the output terminal 17 when the first switch 18 is opened at the rate of the pulse train. Preferably, the multi-state module 22 is in the low resistance state, i.e. the second switch 22 is closed, when the circuit 10 is in normal boost operation so that the circuit 10 has a high output efficiency.

At time T1, if the output terminal 17 is short connected (as is shown, the output voltage is lower than a threshold value 51 at T1), the first switch 18 is opened by the control module 21, and the multi-state module 20 is switched to the high-resistance state, i.e., the second switch 22 is opened (and the third switch 23 is closed if it has been previously opened). In this way, the short-circuit current is limited by the large on-resistance of the third switch 23, which is given by:

$$I_{MAX} = \frac{V_i - V_D}{R_{on}}$$

Wherein $V_i$ is the input voltage, $V_D$ is the forward voltage drop of the diode 14, and $R_{on}$ is the on-resistance of the third switch 23. The current energy stored in the inductor 12 is simultaneously discharged at a current level lower than the value shown in the above formula. Namely, the third switch 23 functions by both limiting the short-circuit current and permitting discharging of the inductor 12.

It will be appreciated that the on-resistance of the third switch 23 may be adjusted according to practical needs. It will also be appreciated that the multi-state module may take on various configurations, for example a SPDT configuration, other than the DPST configuration as shown in FIG. 4. Any configuration that can implement the states of the multi-state module 20 is appropriate.

The circuit illustrated in FIG. 3 may be particularly advantageous in applications, including, but not limited to, those requiring both high output efficiency and short circuit protection. Such applications include, for example, boost converters, drivers for OLED displays, power supply for portable electronic apparatus, and so on. In particular, the energy is transferred to the output terminal 17 through the second switch 22 with low on-resistance when the circuit 10 operates in the normal boost mode; the circuit current flows through and is limited by the third switch 23 in case of a short circuit connection. In addition, the circuit diagram is easy to be implemented and the logic control thereof is simple and easy to be integrated into other logic control, as will be discussed hereinafter. Moreover, the embodiments can prevent power loss when the circuit is in a standby mode by operating according to the mode shown in FIG. 6.

Figure 6:
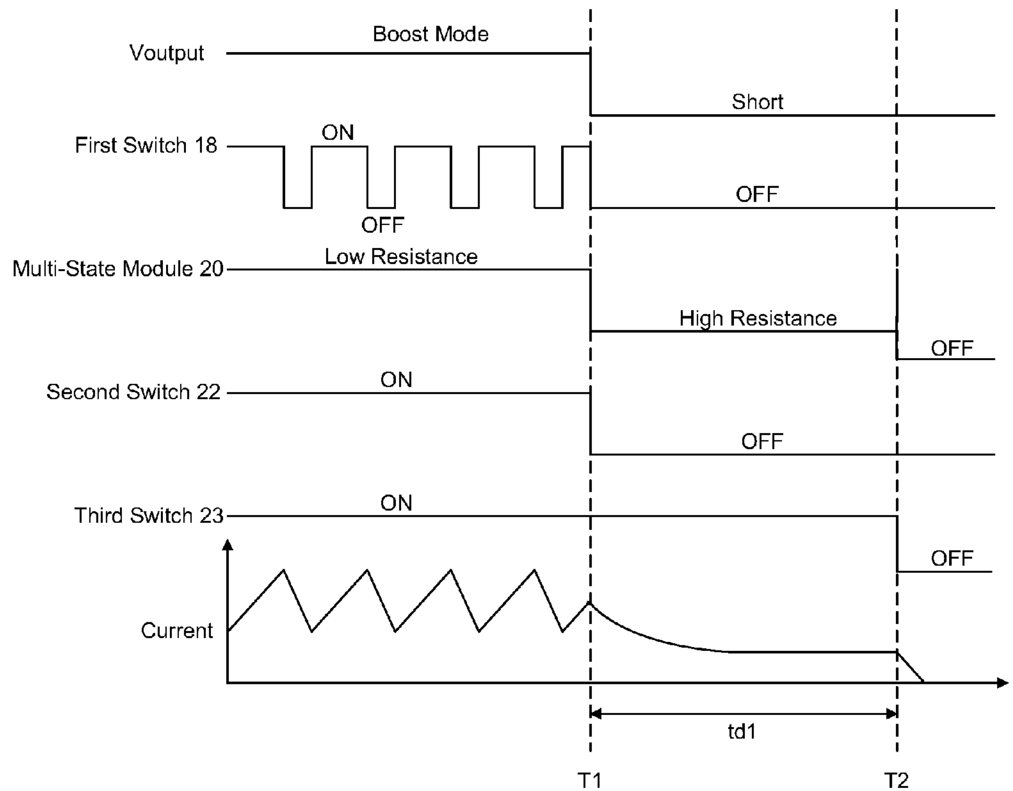
FIG. 6 illustrates another operation mode of the circuit of FIG. 3.

FIG. 6 shows another exemplary operation mode of the circuit of FIGS. 3 and 4. With respect to the operation mode shown in FIG. 5, after the multi-state module 20 is kept in the high resistance state for a duration of a first time delay td1, the multi-state module 20 is switched to an off-state by further opening the third switch 23 at a time T2, so that the output terminal 17 is isolated from the input terminal 11 and undesirable power loss of the circuit 10 in the stand-by mode is prevented. It will be appreciated that the duration of the first time delay td1 is configured so that the previously stored energy in the inductor 12 can be carried off safely, i.e., the remaining energy in the inductor 12, the undischarged part during the first time delay, will not cause the voltage at the node 15 to rise to a high level which may damage devices connected to the node 15.

Figure 7:
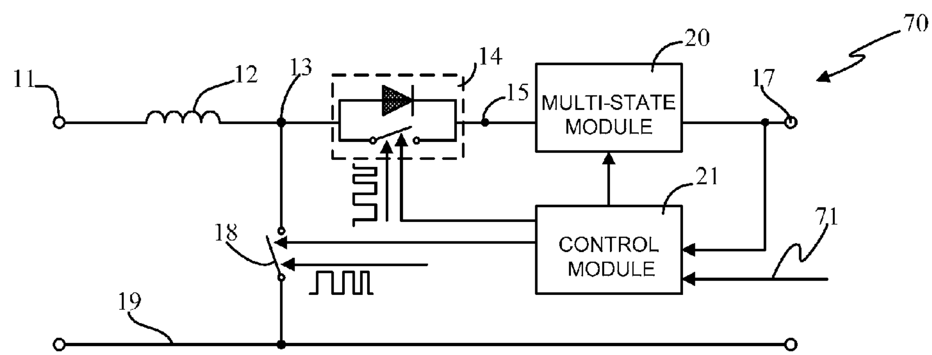
FIG. 7 illustrates a circuit diagram of a second embodiment of a circuit.

FIG. 7 illustrates a simplified circuit diagram of a second embodiment of a circuit wherein the control module 21 is further responsive to a first control signal 71 which enables the circuit 70 to operate in a precharge mode or in a shutdown mode. In detail, the circuit 70 gets started and operates in the precharge mode when the first control signal is in a first state, for example high if the circuit's enable input is active high. The circuit of FIG. 7 operates as follows.

Figure 8:
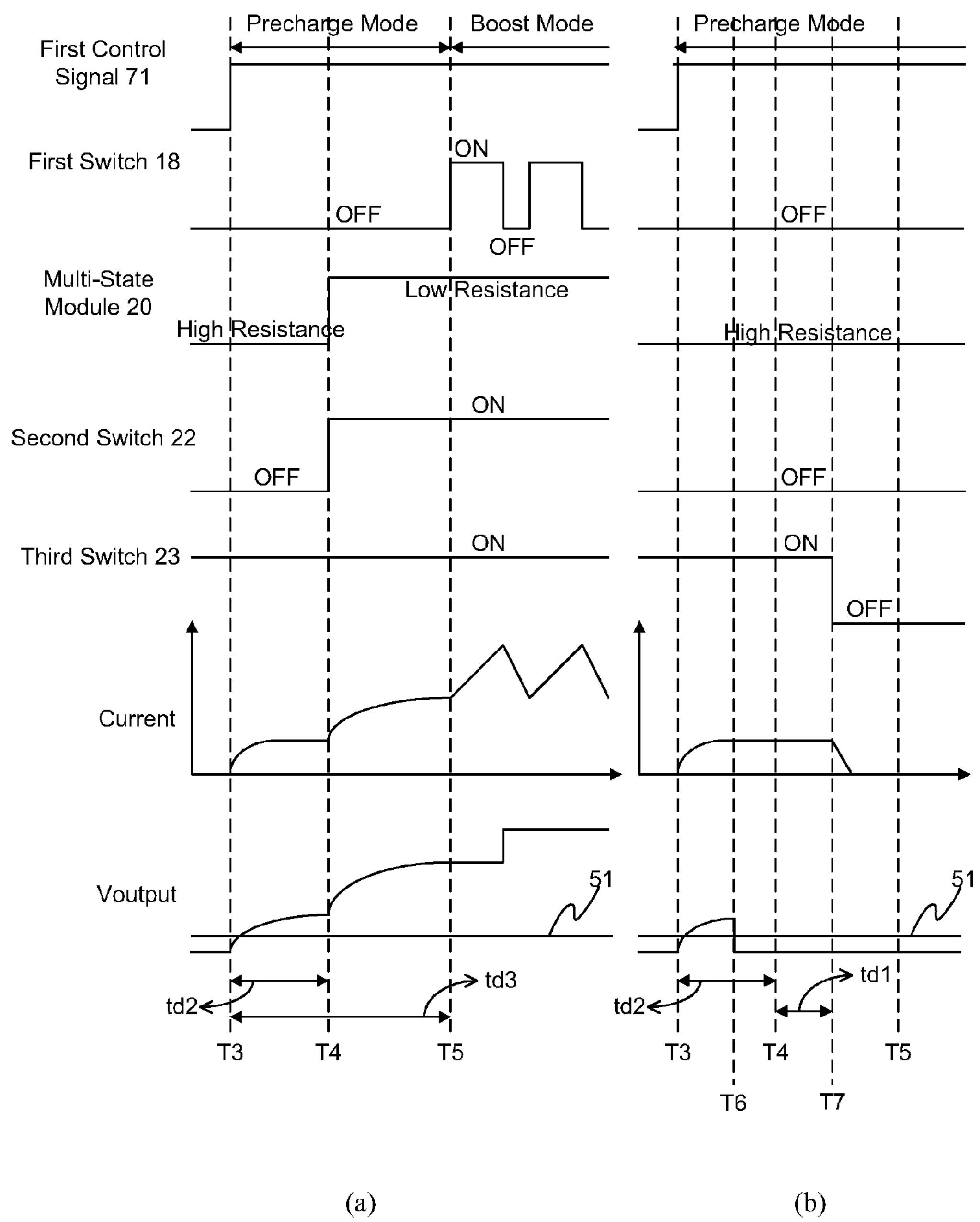
FIGS. 8*a* and 8*b* illustrate an operation mode of the circuit of FIG. 7.

Now referring to FIG. 8*a*, at time T3, the first control signal 71 transits to high, and the circuit 70 starts and enters into the precharge mode accordingly. The control module 21 controls the first switch 18 and the multi-state module 20 so that the first switch 18 is open and the multi-state module 20 is in the high resistance state.

When the multi-state module 20 is formed by the second switch 22 and the third switch 23 as shown in FIG. 4, the multi-state module 20 is controlled in the high resistance state by opening the second switch 22 and closing the third switch 23 as discussed above. Hereinafter, the operation of the circuit 70 will be described by taking it as an example that the multi-state module 20 is formed by the second switch 22 and the third switch 23.

Once the third switch 23 is closed, the rectifying component 14, here shown as a synchronous rectifying component with its body diode illustrated, is connected into the circuit and the body diode is forward biased. As a result, the current through the inductor and the output voltage start increasing. The control module 20 does not respond to the output voltage until a second time delay td2 is complete. The duration of the delay td2 ensures that the output voltage can rise higher than the threshold value 51 when the second time delay td2 is complete if no short circuit happens.

After time T4, the control module 21 controls the first, second, and third switches 18, 22 and 23, and the rectifying component 14 in response to the output voltage.

As shown in FIG. 8*a*, the second switch 22 is closed at time T4 if no short circuit happens during the time delay td2 and thus the output voltage goes higher than the threshold value 51. Once the second switch 22 is closed, the current and the output voltage continue to increase. The first switch 18 and the rectifying component 14 are enabled and enter into a switch mode controlled by a pulse train provide by, for example, a conventional pulse train generator of the circuit 70, when a third time delay td3 is complete. Preferably, the duration of td3 is configured so that the output voltage is pulled close to the input voltage at time T5. After time T5, the circuit 70 proceeds to operate in a boost mode and the inductor 12 is charged and discharged periodically.

As shown in FIG. 8*b*, on the contrary, the second switch 22 is kept open at time T4 if a short circuit happens between time T2 and time T3. Since the multi-state module 20 is in the high resistance state from the beginning of the precharge mode, the current is limited by the on-resistance of the third switch 23, and kept limited after time T4. Preferably the third switch 23 is opened after the first time delay td1 is complete at a time T7, to decrease power loss.

The above operation is equivalent to the fact that, when the circuit 70 operates in the precharge mode, the third switch 23 is always closed, the second switch 22 is disabled until the second time delay td2 is complete and afterwards controlled according to the output voltage, and the first switch 18 and the rectifying component 14 are disabled until the third time delay td3 is completed and afterwards controlled according to the output voltage and their respective pulse trains.

It should be noted that although the short circuit is shown to happen during the second time delay td2, the circuit 70 of FIG. 7 also provides short circuit protection during the rest of the precharge period. In detail, in the case of a short circuit event after time T4, the second switch 22 is opened, which has been previously closed at time T4 as discussed above, by the control module 21 once the short circuit happens and the short circuit current is limited by the on-resistance of the third switch 23. It will be appreciated that the duration of time delay td1 may be any suitable value ensuring that the energy stored in the inductor 12 can be safely removed.

Figure 9:
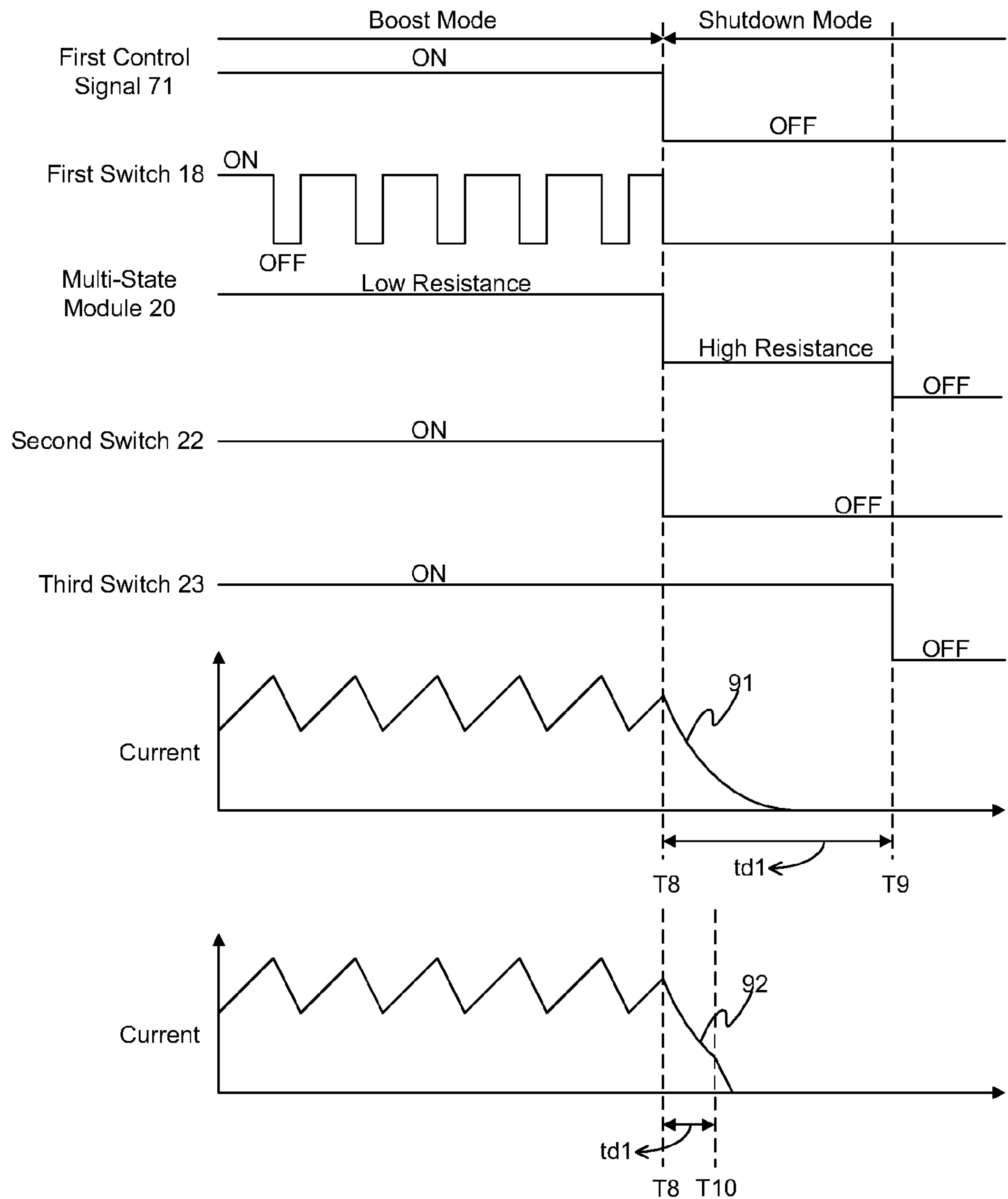
FIG. 9 illustrates another operation mode of the circuit of FIG. 7.

FIG. 9 shows another exemplary operation mode of the circuit of FIG. 7.

At a time T8, the first control signal 71 transits to a second state, low for example. In response, the control module 21 opens the first and second switches, 18 and 22, and the rectifying component 14 (if they are closed before time T8), and keeps the third switch 23 closed (assuming the third switch 23 keep closed before time T8). As a result, see the current waveform 91, the current through the inductor 12 decreases and the energy stored in the inductor 12 is removed safely. When the first time delay td1 is complete, the control module 21 further opens the third switch 23, the multi-state module 20 then switched to the off state, to prevent power loss.

It will be appreciated that the duration td1 is not necessarily long enough to render a complete discharge of the inductor 12, as shown in the waveform 91. Any time delay td1 of suitable values to realize a safe discharge of the inductor 12 may be applied. For example, delay td1 in waveform 92 is shorter than that in waveform 91. At a time T10, the first time delay td1 completes, the third switch 23 is opened accordingly and the output terminal 17 is disconnected from the input terminal 11. The voltage at the node 15 rises as a result of the remained current energy in the inductor 12, and is given by:

$$V_{15} = V_{in} - L\frac{dI}{dt}$$

Wherein $V_{15}$ is the voltage at node 15, $V_{in}$ is the input terminal, L is the inductance of the inductor 12 and dI/dt is the slope of the waveform 92 after time T10. The delay td1 is configured so that the level of $V_{15}$ is acceptable and can be adjusted according to practical needs.

It will be appreciated that although the exemplary operation modes of FIGS. 5 and 6 are illustrated in combination with the circuit of FIGS. 3 and 4, the operation modes are also applicable to the circuit of FIG. 7. It will be further appreciated that although the precharging operation is performed by the control module 21, it is also possible for the control module 21 to cooperate with a discrete or external precharge module to control the operation of the circuit 10 in a precharge mode. And it will be further appreciated that the circuit 10 or 70 can be combined with other circuits, for example, an external resistor divider coupled to the output terminal 17 to achieve a desired output voltage level. It should be noted that circuits according to various embodiments of the invention can be incorporated in boost converters, or any other appropriate electronic devices, appliances, and so on.

Figure 10:
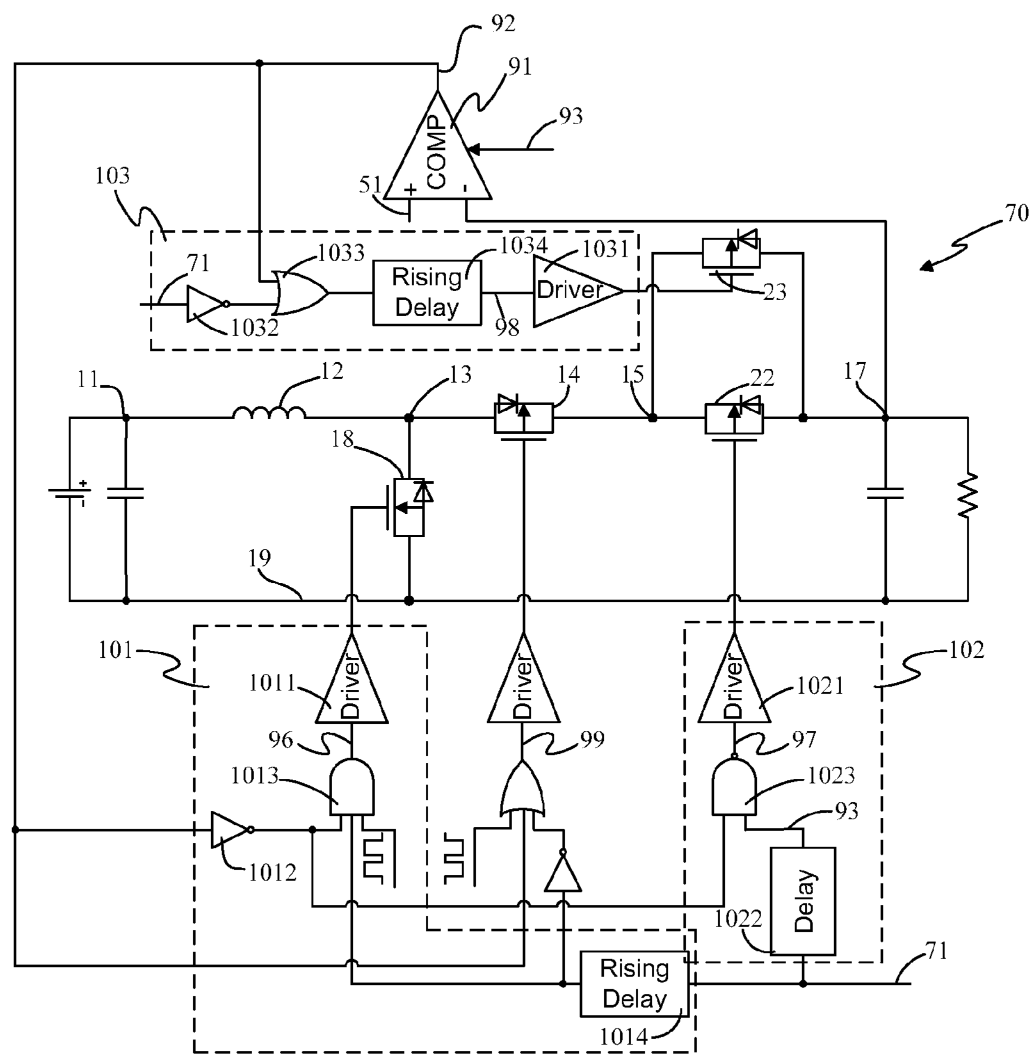
FIG. 10 illustrates an example of practical forming of the circuit diagram of FIG. 7.

FIG. 10 illustrates an example of practical forming of the circuit 70 of FIG. 7. The control module 21 comprises a comparator 91, a first block 101, a second block 102 and a third block 103. The comparator 91 compares the output voltage to the threshold value 51 and generates a second control signal 92 responsively. The second control signal 92 is provided to the first block 101, the second block 102 and the third block 103 respectively for control of the first switch 18, the second switch 22 and the third switch 23. In this example, the rectifying component 14 is shown as a synchronous switch and the second control signal 92 is further provided to the component 14.

In this example, the first block 101 includes an inverter 1012, an AND gate 1013, a first gate driver 1011 and a rising edge delay unit 1014, wherein the AND gate 1013 combines logically an inverse of the second control signal 92, the first control signal 71 delayed by the delay unit 1014 and a pulse train generated by, for example, a conventional pulse train generator, to generate a first drive signal 96. The gate driver 1011 drives the first switch 18 accordingly.

The second block 102 includes a second gate driver 1021, a delay unit 1022 and a NAND gate 1023. The NAND gate 1023 combines logically an inverse of the second control signal 92 and the first control signal 71 delayed by the delay unit 1022 to generate a second drive signal 97. The gate driver 1021 drives the second switch 22 accordingly.

The third block 103 includes a third gate driver 1031, an inverter 1032, an OR gate 1033 and a rising edge delay unit 1034. The OR gate 1033 combines logically the second control signal 92 and an inverse of the first control signal 71 to generate a third drive signal 98. The gate driver 1031 drives the third switch 23 accordingly.

The time delay unit 1022 is configured to receive the first control signal 71 and output a signal 93 delayed by the second time delay td2. In this manner, the second switch 22 is disabled until the second time delay td2 is complete and is afterwards controlled according to the second control signal 92. The signal 93 is further used as the enable signal of the comparator 91 so that the comparator 91 waits to compare the output voltage to the threshold value until the second time delay td2 is complete.

The time delay unit 1034 delays the output of the OR gate 1033 by the first time delay td1 at the rising edge. That means, once the first control signal 71 transits to low which indicates a shut down of the circuit or the second control signal 92 transits to high which indicates an occurrence of short circuit, the output of the OR gate 1033 is delayed by the first time delay td1, and the third switch 23 is kept closed until the first time delay td1 is complete. In this way, the energy stored in the inductor 12 is safely removed.

The time delay unit 1014 delays the first control signal 71 by the third time delay td3 which ensures that the first switch 18 wait to enter switch mode until the output voltage is pulled close to the input voltage.

In this example, the rectifying component 14 is implemented by a power MOS transistor, which receives a pulse train opposite in phase to that of the first switch 18. When the power MOS transistor 14 is closed, the resistance of the conducting channel is much lower than the forward resistance of the body diode, and the diode can be seen as short connected by the conducting channel of the transistor 14. In this way, the efficiency of the circuit is improved.

In FIG. 10, the second and the third switches are shown as PMOS transistors, the transistors 14, 22 and 23 are connected with their source terminals pined together so that their body diodes prevent one another from conducting when the transistors are turned off. It will be appreciated that the on-resistance of the MOS transistors can be modified by changing the width to length ratio of the channel. In the example shown in FIG. 10, the width to length ratio of the third transistor 23 is smaller than that of the second transistor 22.

The exemplary practical forming of the circuit 70 is described with reference to FIG. 10. The similar applies to the circuit 10 of FIG. 3.

It should be noted that the switches can be realized by any suitable semiconductor devices other than MOS transistors, for example, IGBT.

It will be appreciated that the practical forming in FIG. 10 is just exemplary but not restrictive. Any practical forming which can realize the operation modes of circuit 10 or 70 discussed above is appropriate.

In the disclosure herein, operations of circuit embodiment(s) may be described with reference to method embodiment(s) for illustrative purposes. However, it should be appreciated that the operations of the circuits and the implementations of the methods in the disclosure may be independent of one another. That is, the disclosed circuit embodiments may operate according to other methods and the disclosed method embodiments may be implemented through other circuits.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacturing, compositions of matter, means, methods, or steps.

What is claimed is:

1. A circuit, comprising:

an input node configured to receive an input voltage;

an output node configured to supply an output voltage;

a first switch coupled between a first intermediate node and a reference potential node;

an inductive component coupled between the input node and the first intermediate node;

a rectifying component coupled between the first intermediate node and a second intermediate node;

a second switch coupled between the second intermediate node and the output node;

a third switch coupled in parallel with the second switch, wherein the third switch has a larger on-resistance than that of the second switch; and a control module configured to open the first and second switches and close the third switch in response to detection of the output voltage being lower than a threshold value.

2. The circuit of claim 1, wherein the control module is configured to open the third switch after a first time delay, wherein said first time delay initiated in response to detection of the output voltage being lower than the threshold value, is complete.

3. The circuit of claim 1, wherein the control module is configured to close the second switch in response to detection of the output voltage being higher than the threshold value.

4. The circuit of claim 1, wherein the control module is further configured to: enable the circuit to operate in a precharge mode in response to a first control signal being in a first state; and enable the circuit to operate in a shutdown mode in response to the first control signal being in a second state.

5. The circuit of claim 4, wherein the control module is configured to keep the second switch open when the circuit operates in the precharge mode until a second time delay is complete, keep the first switch open until a third time delay is complete, and after expiration of the second time delay to close the second switch if the output voltage is higher than the threshold value, or keep the second switch open if the output voltage is lower than the threshold value, wherein the third time delay is longer than the second time delay.

6. The circuit of claim 4, wherein the control module is configured, when the circuit operates in the shutdown mode, to first open the first and second switches, and then open the third switch after the first time delay is complete.

7. The circuit of claim 1, wherein the rectifying component comprises a synchronous rectifying switch.

8. The circuit of claim 1, wherein the rectifying component, the second and third switches comprise MOS transistors, arranged so that a body diode of the rectifying component and a body diode of each of the second and third switches prevent each other from conducting when the MOS transistors are turned off.

9. The circuit of claim 1, wherein the circuit is operable as a boost converter.

10. A circuit, comprising:

an input node configured to receive an input voltage;

an output node configured to supply an output voltage;

a first switch coupled between a first intermediate node and a reference potential node;

an inductive component coupled between the input node and the first intermediate node;

a rectifying component coupled between the first intermediate node and a second intermediate node;

a multi-state module coupled between the second intermediate node and the output node, said multi-state module configurable to present at least a low resistance between the second intermediate node and the output node and a high resistance between the second intermediate node and the output node; and a control module coupled to the output node, the first switch and the multi-state module, said control module configured to control the first switch and the multi-state module so that the first switch is open and the multi-state module presents the high resistance in response to detection of the output voltage being lower than a threshold value.

11. The circuit of claim 10, wherein the multi-state module further has an off state between the second intermediate node and the output node and said control module is configured to place the multi-state module in the off state after a first time delay initiated by detection of the output voltage being lower than the threshold value.

12. The circuit of claim 11, wherein the control module is further configured to enable the circuit to operate in a precharge mode or in a shutdown mode in response to a first control signal.

13. The circuit of claim 12, wherein the circuit is configured to operate in the precharge mode when the first control signal is in a first state and the circuit is configured to operate in the shutdown mode when the first control signal is in a second state.

14. The circuit of claim 13, wherein the control module is further configured to control the multi-state module to present the high resistance, when the circuit operates in the precharge mode, until expiration of a second time delay, keep the first switch open until expiration of a third time delay, and control the multi-state module to present the low resistance after the second time delay is complete if the output voltage is higher than the threshold value, or present the high resistance if the output voltage is lower than the threshold value, wherein the third time delay is longer than the second time delay.

15. The circuit of claim 12, wherein the control module is further configured to keep the first switch open when the circuit operates in the shutdown mode, and control the multi-state module to first present the high-resistance state and then switch to the off state after expiration of the first time delay.

16. The circuit of claim 10, wherein said control module is configured to control the multi-state module to present the low resistance state in response to detection of the output voltage being higher than a threshold value.

17. The circuit of claim 10, wherein the multi-state module comprises a second switch and a third switch connected in parallel with each other between the second intermediate node and the output node, and wherein the third switch has a larger on-resistance than that of the second switch.

18. The circuit of claim 17, wherein the control module comprises:

a comparator configured to generate a second control signal in response to a comparison of the output voltage to the threshold value;

a first block coupled to receive the second control signal and configured to generate a first drive signal for the first switch;

a second block coupled to receive the second control signal and configured to generate a second drive signal for the second switch; and a third block coupled to receive the second control signal and configured to generate a third drive signal for the third switch.

19. The circuit of claim 17, wherein the rectifying component comprises a synchronous rectifying switch.

20. The circuit of claim 17, wherein the rectifying component, the second and third switches comprise MOS transistors, arranged so that a body diode of the rectifying component and a body diode of each of the second and third switches prevent each other from conducting when the MOS transistors are turned off.

21. The circuit of claim 10, wherein the circuit is operable as a boost converter.

22. A method, comprising:

comparing an output voltage of a circuit to a threshold value;

coupling a high resistance serially in a current path between an input node and an output node of the circuit if said comparison indicates that the output voltage is lower than the threshold value; and discharging the circuit through the high resistance so as to limit a current level in the current path.

23. The method of claim 22, further comprising isolating the input node from the output node after expiration of a first time delay following detection of the output voltage being less than the threshold value.

24. The method of claim 23, wherein the coupling comprises opening a first switch and closing a second switch of the circuit, the first and second switches being coupled in parallel with each other in the current path between the input node and the output node, wherein the second switch has a larger on-resistance than that of the first switch.

25. The method of claim 24, wherein the isolating comprises opening the second switch after expiration of the first time delay.

26. The method of claim 24, further comprising:

precharging the circuit while the second switch is closed and the first switch is open, wherein the first switch is open until performing said comparing of the output voltage of the circuit to the threshold value.

27. The method of claim 26, wherein the first switch is controlled according to a result of the comparing between the output voltage of the circuit and the threshold value after the comparing is initiated.

28. The method of claim 22, wherein the discharging comprises discharging an inductive component.

* * * * *